United States Patent
Imoto (10) Patent No.: US 7,235,749 B2
(45) Date of Patent: Jun. 26, 2007

(54) COLLISION IMPACT DETECTOR FOR USE IN AUTOMOTIVE VEHICLE

(75) Inventor: Masahiko Imoto, Kariya (JP)

(73) Assignee: DENSO Corporation, Aichi-ken (JP)

( * ) Notice: Subject to any disclaimer, the term of this patent is extended or adjusted under 35 U.S.C. 154(b) by 616 days.

(21) Appl. No.: 10/834,027

(22) Filed: Apr. 29, 2004

(65) Prior Publication Data
US 2005/0000287 A1    Jan. 6, 2005

(30) Foreign Application Priority Data
Jun. 20, 2003    (JP)    ............................. 2003-176696

(51) Int. Cl.
*H01H 35/14* (2006.01)
(52) U.S. Cl. ........................... 200/61.45 R; 200/61.48; 200/61.49; 200/61.52
(58) Field of Classification Search .............. 200/61.45 R–61.52; 73/514.01, 514.16, 514.21, 514.22, 73/514.23, 514.24, 514.35, 514.36, 514.38
See application file for complete search history.

(56) References Cited

U.S. PATENT DOCUMENTS

| | | | |
|---|---|---|---|
| 2,920,157 A * | 1/1960 | Rabinow et al. | 200/61.48 |
| 3,054,870 A | 9/1962 | Wagoner, Jr. | |
| 4,022,997 A * | 5/1977 | Inagaki et al. | 200/61.45 R |
| 4,188,517 A * | 2/1980 | Narita et al. | 200/61.45 R |
| 5,008,501 A * | 4/1991 | Kumita et al. | 200/61.45 R |
| 6,093,898 A * | 7/2000 | Sakamoto et al. | 200/61.48 |
| 6,172,313 B1 * | 1/2001 | Sakamoto et al. | 200/61.48 |
| 6,184,776 B1 * | 2/2001 | Danek et al. | 200/61.45 R |
| 6,512,310 B1 | 1/2003 | Ohnishi | |
| 6,528,747 B2 * | 3/2003 | Sakamoto et al. | 200/61.45 R |
| 6,642,461 B2 * | 11/2003 | Imoto | 200/61.45 R |
| 6,717,078 B2 * | 4/2004 | Yoshida et al. | 200/61.45 R |
| 2003/0000816 A1 | 1/2003 | Imoto | |
| 2005/0000287 A1 | 1/2005 | Imoto | |

OTHER PUBLICATIONS

First Office Action from Chinese Patent Office issued on May 12, 2006 for the corresponding Chinese patent application No. 200410060011.5 ( a copy and English translation thereof).
Second Office Action from Chinese Patent Office issued on Nov. 3, 2006 for the corresponding Chinese patent application No. 200410060011.5 (a copy and English translation thereof).
Communication from European Patent Office dated Jun. 28, 2005.

* cited by examiner

*Primary Examiner*—Michael A. Friedhofer
(74) *Attorney, Agent, or Firm*—Posz Law Group, PLC

(57) ABSTRACT

A collision impact detector detects deceleration of a vehicle caused by its collision with another vehicle or an obstacle. A rotor is rotatably supported on a shaft and biased by a coil spring in a direction opposite to a rotational direction in which the rotor is rotated by the deceleration. One axial end of the coil spring is supported by a first support integrally formed with the rotor, and the other axial end of the coil spring is supported by a second support formed separately from the rotor. In this manner, a friction torque generated between the coil spring and the second support is eliminated, thereby considerably reducing a total friction torque associated with rotation of the rotor. The second support may be formed either integrally with or separately from a housing supporting the shaft.

7 Claims, 7 Drawing Sheets

COLLISION IMPACT DETECTOR FOR USE IN AUTOMOTIVE VEHICLE

CROSS-REFERENCE TO RELATED APPLICATION

This application is based upon and claims benefit of priority of Japanese Patent Application No. 2003-176696 filed on Jun. 20, 2003, the content of which is incorporated herein by reference.

BACKGROUND OF THE INVENTION

1. Field of the Invention

The present invention relates to a detector for detecting an impact caused by a collision of an automotive vehicle. The collision impact is represented by a vehicle deceleration exceeding a predetermined limit.

2. Description of Related Art

Figure 11:
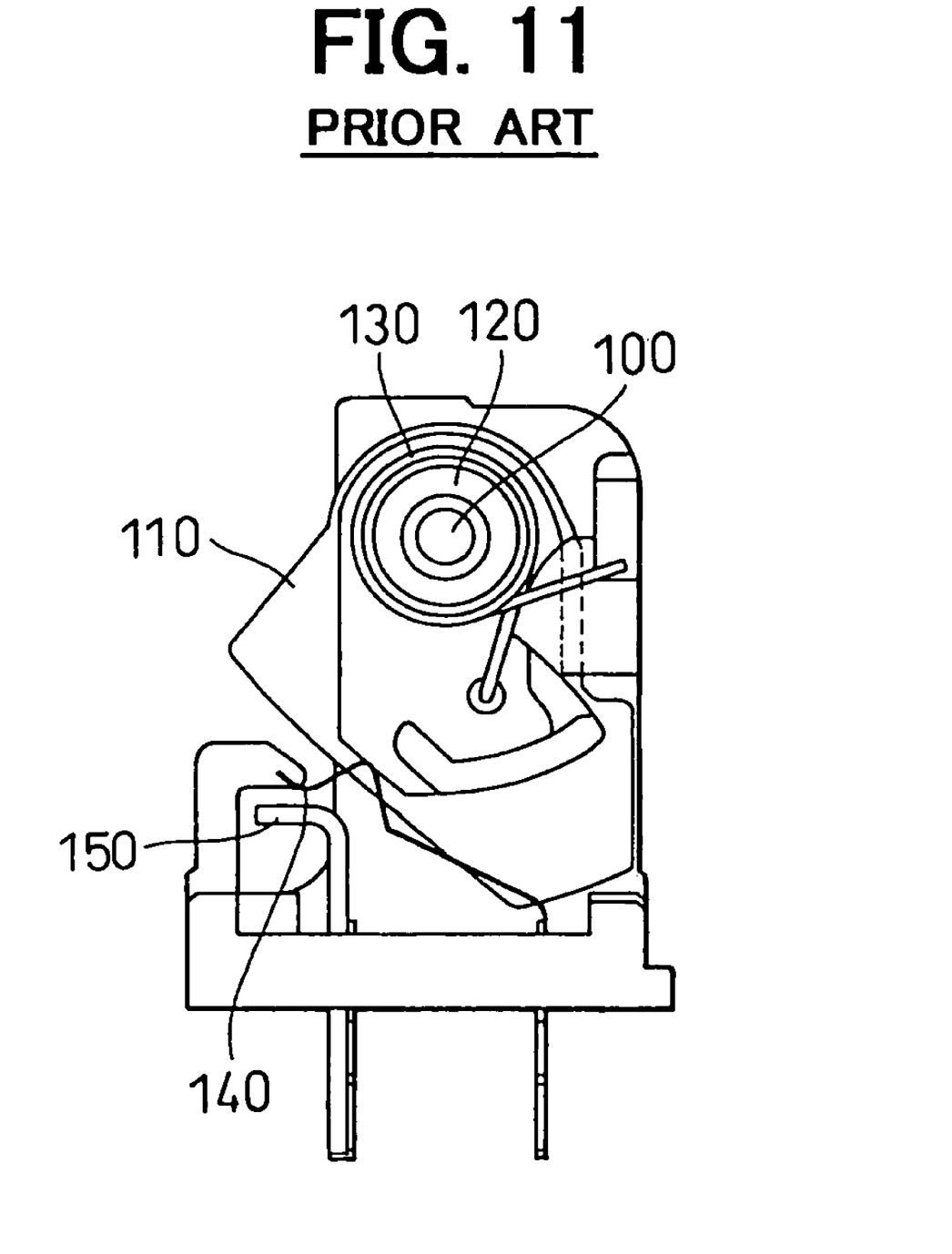
FIG. 11 is a front view briefly showing a structure of a conventional collision impact detector.
Figure 12A:
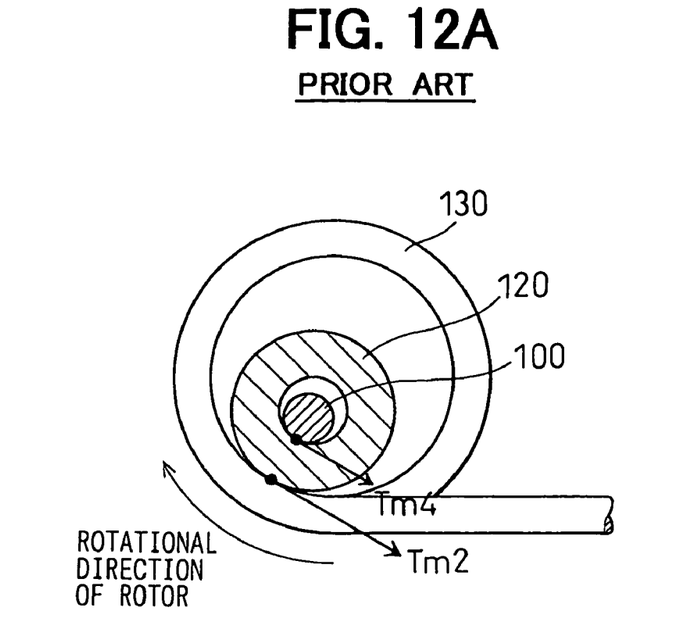
FIGS. 12A and 12B are schematic views showing positions where friction torques are generated in the conventional collision impact detector shown in FIG. 11.
Figure 12B:
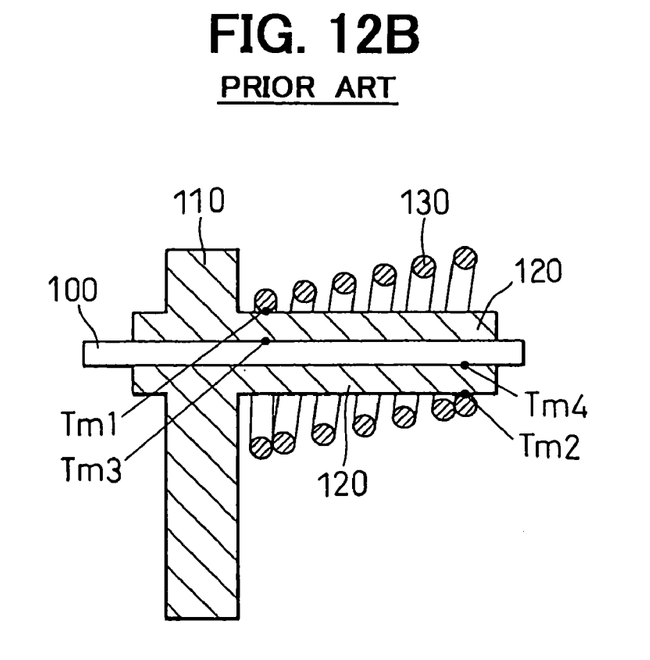

An example of a collision detector is shown in JP-A-2003-16892. The essential structure of the collision detector is shown in FIG. 11 and various friction torques associated with rotation of its rotor are shown in FIGS. 12A and 12B attached hereto. As shown in FIG. 11, a rotor 110 is rotatably supported on a shaft 100 which is in turn fixed to a housing. The rotor 110 has a cylindrical portion 120 for supporting a coil spring 130 (better seen in FIGS. 12A and 12B). The coil spring 130 biases the rotor 110 in one direction around the shaft 100, and the rotor 110 rotates in the other direction (clockwise direction in FIG. 11) against the biasing force of the coil spring 130 when a deceleration exceeding a certain level occurs. A pair of contacts, a stationary contact 150 and a movable contact 140, are closed by the rotation of the rotor 110, thereby detecting a vehicle collision.

Figure 4:
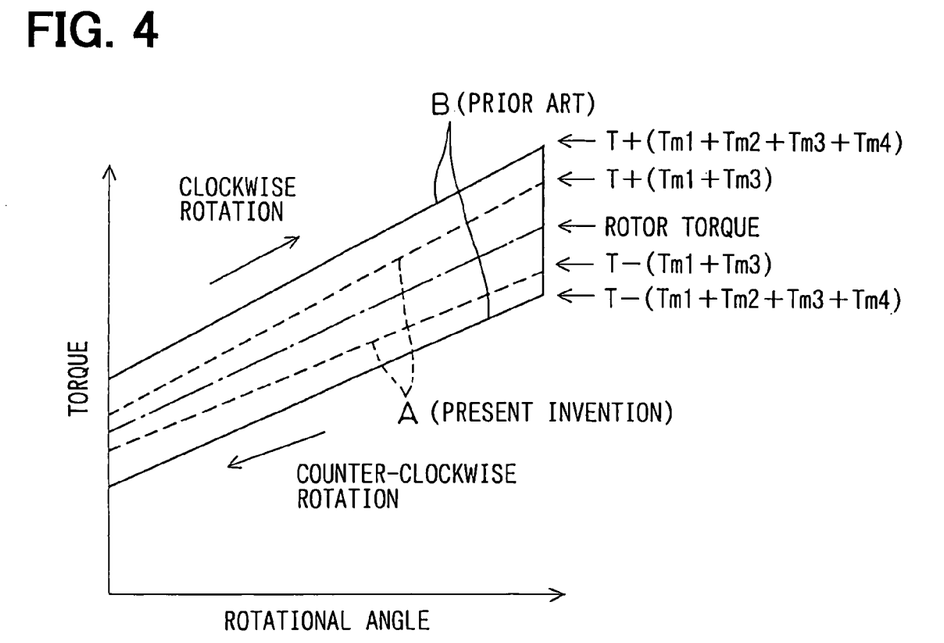
FIG. 4 is a graph showing a total torque imposed on a rotor when the rotor rotates clockwise and counter-clockwise, the total torque of a conventional detector being shown with lines "B" and that of the present invention with lines "A"

The shaft 100 and the coil spring 130 do not rotate when the rotor 110 rotates. Therefore, as shown in FIGS. 12A and 12B, friction torques Tm3 and Tm4 are generated between the rotor 110 and the shaft 100. Also, friction torques Tm1 and Tm2 are similarly generated between the cylindrical portion 120 and the coil spring 130. These friction torques are added to a rotor torque T when the rotor 110 is rotated clockwise (when the rotor 110 is rotated by the deceleration), while they are subtracted from the rotor torque T, as illustrated with solid lines "B" in FIG. 4. In other words, all the friction torques Tm1, Tm2, Tm3 and Tm4 are added when the rotor 110 rotates clockwise and are subtracted when the rotor 110 rotates counter-clockwise. This means that the total torque considerably differs according to the rotational directions. FIG. 4 also shows the total torque attained in the present invention with dotted lines "A".

Accuracy in detecting the collision impact is decreased as the difference of the total friction torques becomes large. In addition, the friction torque is not constant, but shows a considerably large dispersion. Accordingly, it is required to reduce the amount of friction torque to attain a stable and accurate performance of the detector.

SUMMARY OF THE INVENTION

The present invention has been made in view of the above-mentioned problem, and an object of the present invention is to provide an improved collision impact detector, in which friction torque associated with rotation of a rotor is reduced.

The collision impact detector includes a rotor that is rotated by deceleration caused a collision of a vehicle. The rotor is rotatably supported on a shaft that is fixed to a housing and is biased in one rotational direction around the shaft by a coil spring. One axial end of the coil spring is supported by a first support integrally formed with the rotor, and the other axial end of the coil spring is supported by a second support which is separately formed from the rotor and the first support.

The rotor rotates around the shaft against the biasing force of the coil spring when deceleration due to a vehicle collision is applied to the rotor. When the rotor rotates by a predetermined angle, a pair of contacts is closed to thereby generate a signal indicating a vehicle collision. Since the coil spring is partly supported on the second support that does not rotate together with the rotor, the friction torque associated with rotation of the rotor can be made considerably small. Therefore, a difference of the friction torque generated in both rotational directions is made small, and accuracy and stability in the detector operation can be secured.

Preferably, both the first and the second supports are disposed inside the coil spring, but it is also possible to support the coil spring at its outer diameter. The second support may be integrally formed with the housing supporting the shaft. It is also possible to form the second support separately from the housing. Other objects and features of the present invention will become more readily apparent from a better understanding of the preferred embodiments described below with reference to the following drawings.

DETAILED DESCRIPTION OF THE PREFERRED EMBODIMENTS

A first embodiment of the present invention will be described with reference to FIGS. 1–4. The structure of an impact detector 1 will be described, referring to FIGS. 1–3. The impact detector 1 includes: a shaft 3 fixedly connected to a housing 2; a rotor 4 rotatably supported on the shaft 3; a coil spring 5 biasing the rotor 4 in the counter-clockwise direction in FIG. 3; supporting portions (a first support 6 and a second support 7) for supporting the coil spring 5 thereon; a pair of contacts (a stationary contact 9 and a movable contact 8) that are closed when the rotor 4 rotates clockwise by a predetermined angle; and an electrical circuit (not shown) for outputting a signal when the pair of contacts are closed.

Figure 3:
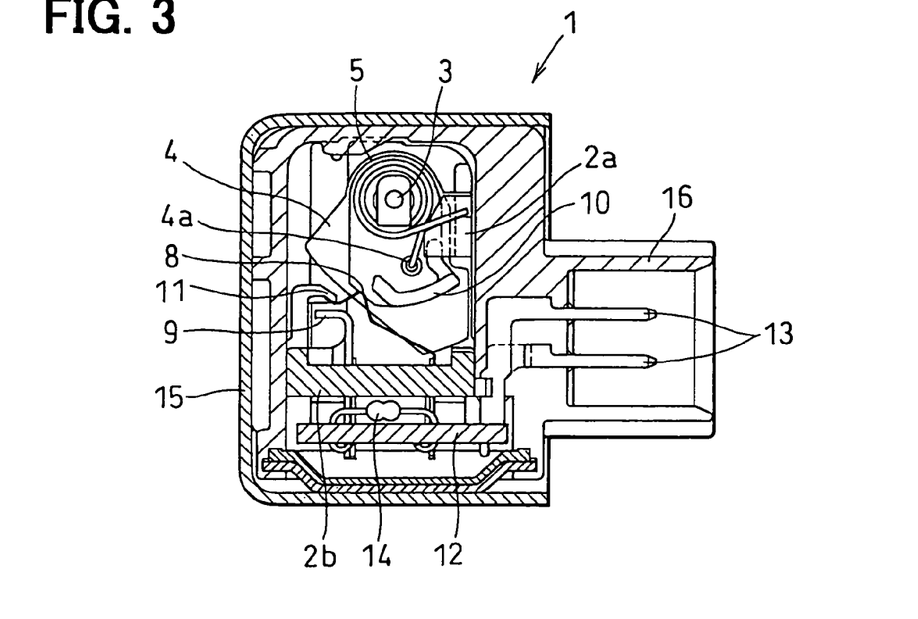
FIG. 3 is another cross-sectional view showing the same collision impact detector as shown in FIG. 2, taken along a surface perpendicular to the longitudinal direction of the shaft.

The rotor 4 has a gravity center offset from its rotational center, and the rotor 4 rotates around the rotational center when a rotational moment is applied to the gravity center. When the vehicle is decelerated due to a collision, the rotational moment is applied to the gravity center. A cam 10 for closing the pair of contacts 8, 9 when the rotor is rotated by a predetermined angle is fixed to the rotor 4. As shown in FIG. 3, one end of the coil spring 5 is anchored to a supporting hole 4a formed on the rotor 4, and the other end of the coil spring 5 abuts against a supporting wall 2a formed on the housing 2. Thus, the coil spring 5 biases the rotor 4 in the counter-clockwise direction (in FIG. 3) and holds the rotor 4 at is initial position.

Figure 1:
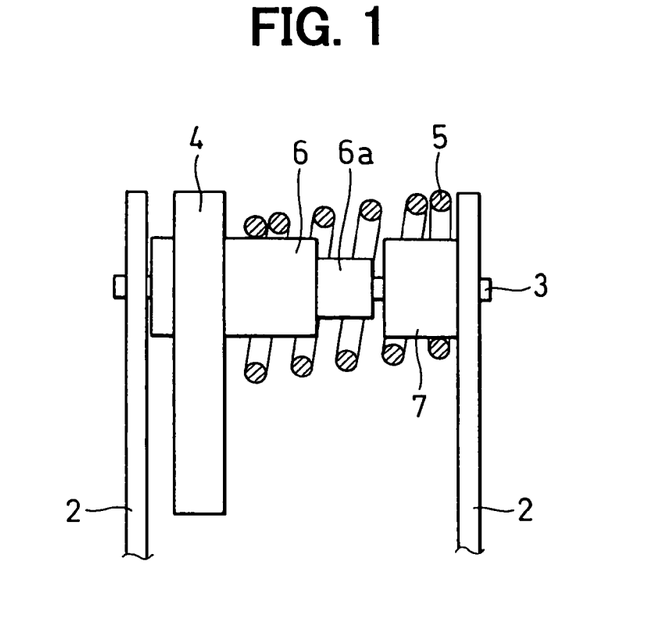
FIG. 1 is a side view showing a structure for supporting a coil spring on supporting portions, as a first embodiment of the present invention.
Figure 2:
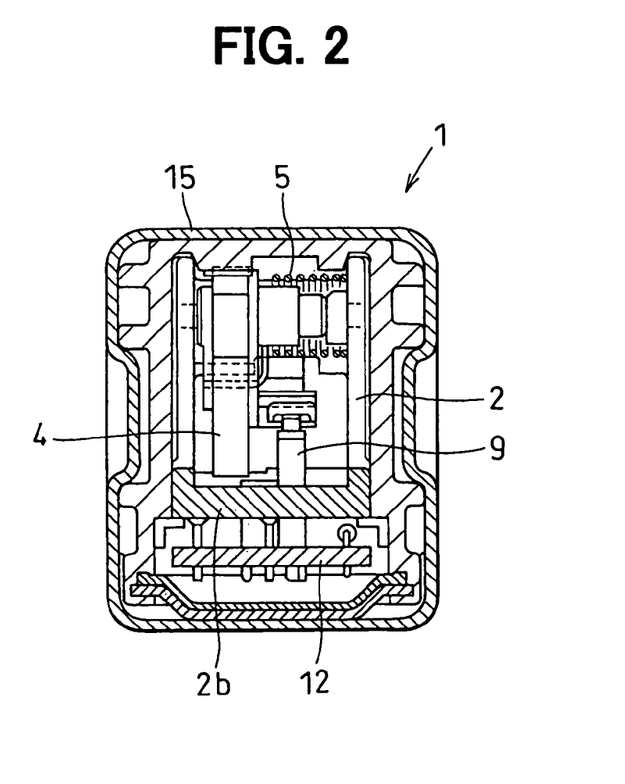
FIG. 2 is a cross-sectional view briefly showing a structure of a collision impact detector of the present invention, taken along a surface parallel to a longitudinal direction of a shaft.

As shown in FIG. 1, the supporting portions for supporting the coil spring 5 thereon are composed of a first support 6 and a second support 7. The first support 6 has a cylindrical portion integrally formed with the rotor 4, and the cylindrical portion is rotatably supported on the shaft 3. The first support 6 also has a small-diameter portion 6a coaxially extending in the axial direction and integrally formed with the cylindrical portion. The second support 7 has a cylindrical portion fixedly connected to the housing 2. The second support 7 are separately formed from the rotor 4 and the first support 6. An inner diameter of the coil spring 5 is supported on the first support 6 at its one end and on the second support 7 at the other end.

As shown in FIG. 3, the movable contact 8 and the stationary contact 9 are fixed to a base portion 2b of the housing 2. The movable contact 8 is made of a thin leaf spring and biased by its own spring action to abut against a stopper 11. The movable contact 8 is elastically deformed by the cam 10 and contacts the stationary contact 9 when the rotor 4 rotates clockwise by a predetermined angle. The stationary contact 9 is made of a metal plate which is several times thicker than the movable contact 8 to give it a high rigidity, so that the stationary contact 9 is not vibrated by a collision impact. The tip of the stationary contact 9 is bent away from the rotor 4 to avoid interference with the rotor 4.

An electrical circuit for generating a signal upon closure of the pair of contacts 8, 9 is formed on a printed circuit board 12 located underneath the base portion 2b of the housing 2. The pair of contacts 8, 9, output terminals 13 and a resistor 14 are electrically connected to the printed circuit board 12. The printed circuit board 12 is contained in a case 15 together with the housing 2 and other components. The output terminals 13 are led out through a connector 16 formed integrally with the housing 2. The output terminals 13 are electrically connected to an electronic control unit mounted on a vehicle through wires (not shown).

The collision impact detector 1 described above operates in the following manner. When the vehicle is excessively decelerated due to a collision, the rotor 4 is rotated in the clockwise direction (in FIG. 3) against the biasing force of the coil spring 5. When the rotor 4 rotates by a predetermined angle, the pair of contacts 8, 9 are closed by being pushed with the cam 10 connected to the rotor 4. Upon closure of the pair of contacts 8, 9, a signal indicating a collision is sent to the electronic control unit mounted on the vehicle through the output terminals 13.

The first support 6 that supports one end of the coil spring 5 is separated from the second support 7 that supports the other end of the coil spring 5. The second support 7 does not rotate together with the rotor 4 and the first support 6. Therefore, the friction torques Tm2 and Tm4 (shown in FIGS. 12A and 12B) which are generated in the conventional detector are eliminated. Namely, the friction torque Tm2 otherwise generated between the support and the coil spring 5 and the friction torque Tm4 otherwise generated between the shaft and the support are eliminated.

As shown in FIG. 4 with dotted lines "A", the total torque when the rotor 4 rotates in the clockwise direction is expressed as: $T+(Tm1+Tm3)$. Similarly, the total torque in the counter-clockwise direction is expressed as: $T-(Tm1+Tm3)$. T represents a torque applied to the rotor 4 solely by the collision deceleration without counting any friction torque. Tm1 and Tm3 are friction torques generated due to the rotation of the rotor 4 at the respective positions shown in FIG. 12B. Therefore, the torque difference between the clockwise rotation and the counter-clockwise rotation is considerably reduced, as compared with that of the conventional detector. In this manner, the stability and the accuracy in the detector operation are improved.

Figure 5:
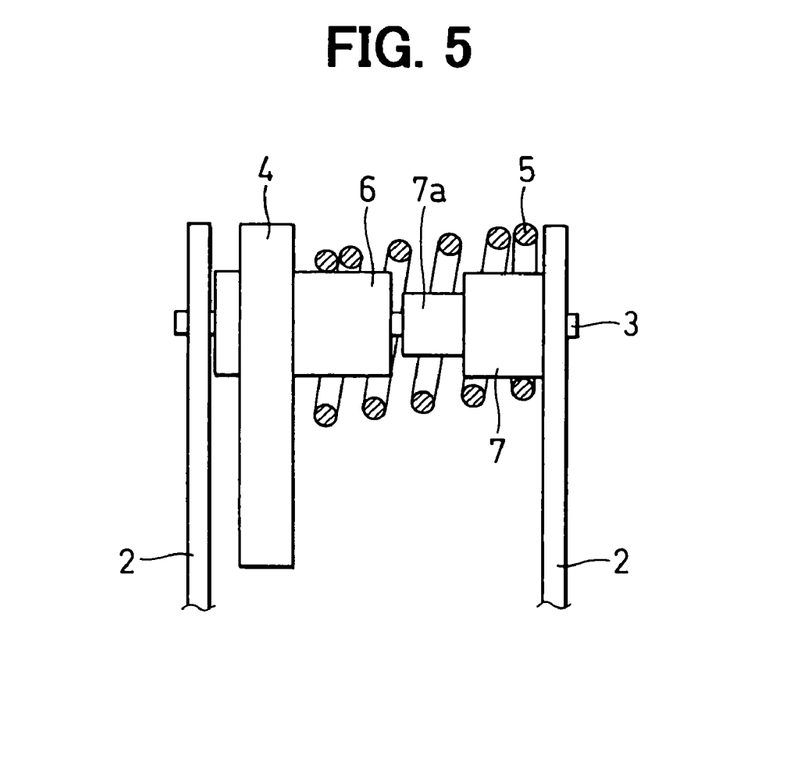
FIG. 5 is a side view showing a structure for supporting a coil spring on supporting portions, as a modified form of the first embodiment shown in FIG. 1.

The first embodiment shown in FIG. 1 may be modified to a form shown in FIG. 5. In this modified form, the small-diameter portion 6a extending from the first support 6 is eliminated, and instead, a small-diameter portion 7a extending from the second support 7 is formed. Other structures are the same as those of the first embodiment. Alternatively, both of the small-diameter portions 6a and 7a may be formed to extend from the first support 6 and the second support 7, respectively. In these modified forms, the same advantage as in the first embodiment can be obtained.

Figure 6:
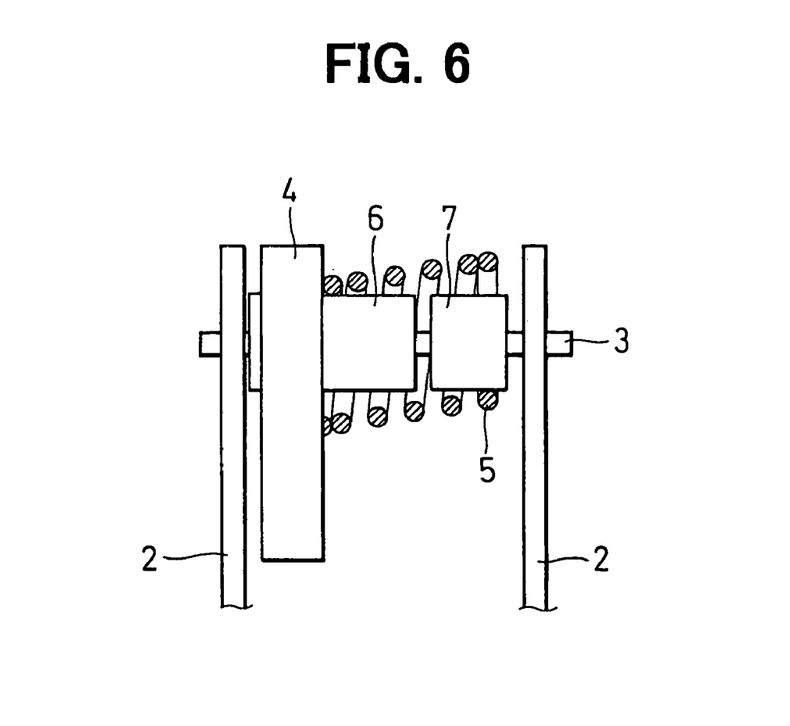
FIG. 6 is a side view showing a structure for supporting a coil spring on supporting portions, as a second embodiment of the present invention.

A second embodiment of the present invention is shown in FIG. 6. In this embodiment, the second support 7 is made separately from the housing 2 and is either rotatably or fixedly supported on the shaft 3. The same advantage attained in the first embodiment can be attained in this second embodiment, too.

Figure 7:
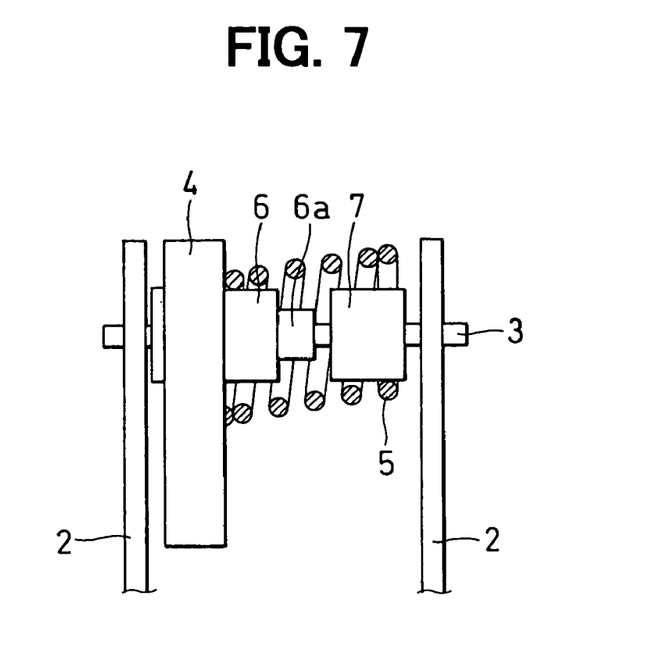
FIG. 7 is a side view showing a structure for supporting a coil spring on supporting portions, as a modified form of the second embodiment shown in FIG. 6.
Figure 8:
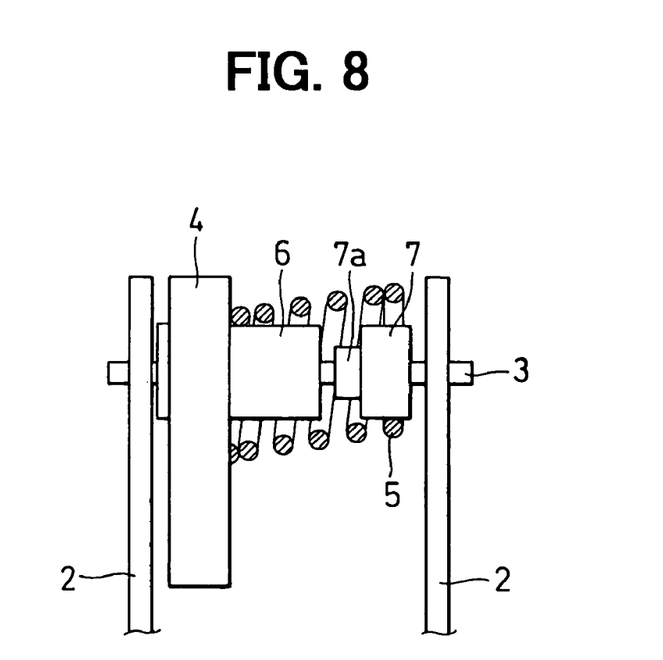
FIG. 8 shows another modified form of the second embodiment shown in FIG. 6.

The second embodiment may be modified to the forms shown in FIGS. 7 and 8, respectively. In the form shown in FIG. 7, a small-diameter portion 6a is extended from the first support 6. In the form shown in FIG. 8, a small-diameter portion 7a is extended from the second support 7. In these modified forms, the same advantages as in the foregoing embodiments can be attained.

Figure 9:
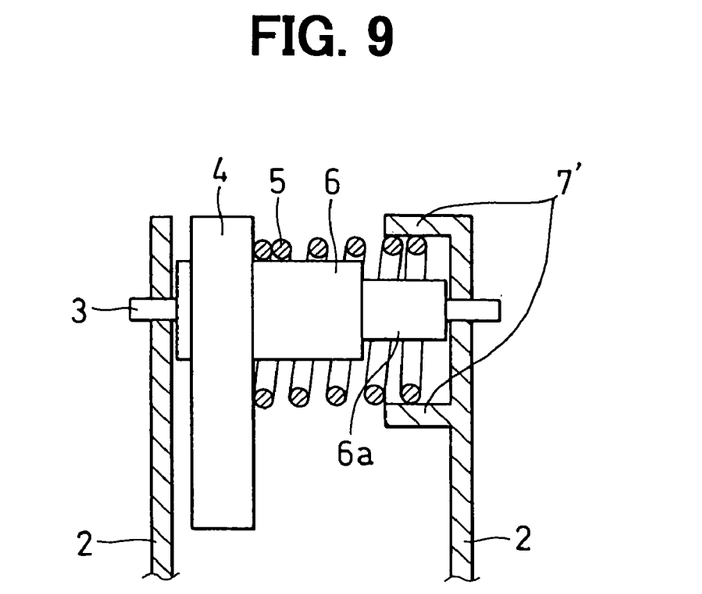
FIG. 9 is a side view showing a structure for supporting a coil spring on supporting portions, as a third embodiment of the present invention.

A third embodiment of the present invention is shown in FIG. 9. In this embodiment, the second support 7' is formed in a circular cup that supports the outer diameter of the coil spring 5. The cup-shaped second support 7' is integrally formed with the housing 2. Since no friction is generated between the second support 7' and the coil spring 5 in this embodiment, too, the same advantage as in the foregoing embodiments can be attained. In this embodiment, the small-diameter portion 6a is connected to the first support 6, and a small gap is provided between the small-diameter portion 6a and the housing 2. Due to the presence of the small-diameter portion 6a, an axial shift of the rotor 4 is restricted, and therefore, the coil spring 5 is not unnecessarily compressed in its axial direction. This also helps improve the stable operation of the collision impact detector 1.

Figure 10:
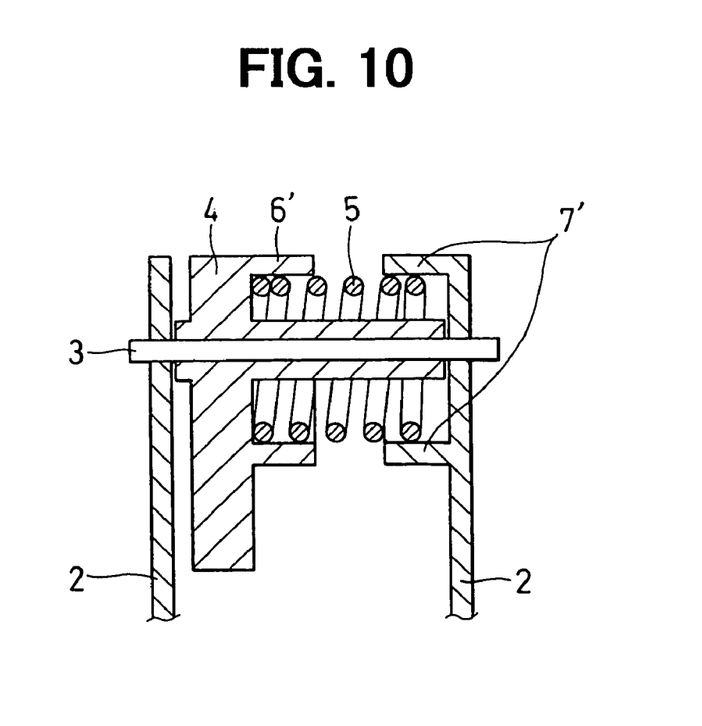
FIG. 10 is a side view showing a structure for supporting a coil spring on supporting portions, as a fourth embodiment of the present invention.

A fourth embodiment of the present invention is shown in FIG. 10. In this embodiment, both of the first support 6' and the second support 7' are formed in a circular cup shape so that the outer diameter of the coil spring 5 is supported in the both circular cups. The second support 7' may be formed in the same cylindrical shape as that of the first embodiment or the second embodiment, so that the inner diameter of the coil spring 5 is supported on the cylindrical portion of the second support.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A collision impact detector for use in an automotive vehicle, the detector comprising:
   a shaft supported by a housing;
   a rotor rotatably supported on the shaft;
   a coil spring biasing the rotor in one rotational direction around the shaft;
   a first support for supporting one axial end of the coil spring, the first support being integrally formed with the rotor;
   a second support for supporting the other axial end of the coil spring, the second support being separately formed from the rotor so that the second support does not rotate together with the rotor; and
   a pair of contacts adapted to be closed when the rotor is rotated by deceleration of a collision impact in the other rotational direction around the shaft against a biasing force of the coil spring by a predetermined angle.

2. The collision impact detector as in claim 1, wherein the second support includes a cylindrical portion supported by the shaft, and an inner diameter of the coil spring is supported on the cylindrical portion.

3. The collision impact detector as in claim 2, wherein the second support is integrally formed with the housing supporting the shaft.

4. The collision impact detector as in claim 2, wherein the second support is separately formed from the housing supporting the shaft.

5. The collision impact detector as in claim 1, wherein the second support includes a circular cup formed integrally with the housing, and an outer diameter of the coil spring is supported in the circular cup.

6. The collision impact detector as in claim 1, wherein the first support includes a cylindrical portion rotatably supported on the shaft, and an inner diameter of the coil spring is supported on the cylindrical portion.

7. The collision impact detector as in claim 1, wherein the first support includes a circular cup formed integrally with the rotor, and an outer diameter of the coil spring is supported in the circular cup.

* * * * *